United States Patent
Dönges et al.

(10) Patent No.: US 11,946,510 B2
(45) Date of Patent: Apr. 2, 2024

(54) SHAFT ASSEMBLY

(71) Applicant: Muhr und Bender KG, Attendorn (DE)

(72) Inventors: Benjamin Dönges, Dortmund (DE); Stefan Buchkremer, Cologne (DE); Maximilian Rolfes, Sundern (DE); Vladimir Kobelev, Attendorn (DE)

(73) Assignee: Muhr und Bender KG, Attendorn (DE)

( * ) Notice: Subject to any disclaimer, the term of this patent is extended or adjusted under 35 U.S.C. 154(b) by 405 days.

(21) Appl. No.: 17/276,853

(22) PCT Filed: Sep. 13, 2019

(86) PCT No.: PCT/EP2019/074501
§ 371 (c)(1),
(2) Date: Mar. 17, 2021

(87) PCT Pub. No.: WO2020/058122
PCT Pub. Date: Mar. 26, 2020

(65) Prior Publication Data
US 2022/0034367 A1    Feb. 3, 2022

(30) Foreign Application Priority Data
Sep. 19, 2018  (DE) .......................... 102018122977.1

(51) Int. Cl.
*F16D 1/072*     (2006.01)
*F16D 1/08*      (2006.01)
(Continued)

(52) U.S. Cl.
CPC .......... *F16D 1/072* (2013.01); *F16D 1/0805* (2013.01); *F16D 1/10* (2013.01); *F16D 1/12* (2013.01); *F16D 2001/102* (2013.01)

(58) Field of Classification Search
None
See application file for complete search history.

(56) References Cited

U.S. PATENT DOCUMENTS 3,438,660 A  *  4/1969  Steiner ................. F16D 1/0835
                                                      403/368
4,006,993 A     2/1977  Woerlee
(Continued)

FOREIGN PATENT DOCUMENTS

DE       19521755 C1    10/1996
DE       19624048 A1    12/1997
(Continued)

OTHER PUBLICATIONS

International Search Report and Written Opinion for PCT/EP2019/074501 daetd Dec. 13, 2019 (11 pages; with English translation).

*Primary Examiner* — Matthew R McMahon
(74) *Attorney, Agent, or Firm* — Bejin Bieneman PLC

(57) ABSTRACT

A shaft assembly comprises: a hollow shaft with an axis of rotation, and a hub body connected to the hub body in a force-locking manner, wherein the hollow shaft comprises, viewed in cross-section, a circumferentially closed wall with a plurality of circumferentially distributed support portions in abutting contact with the hub body and with spring portions spaced from an inner circumferential face of the hub body, wherein inner surface regions of the spring portions lie on a smaller radius around the axis of rotation than inner face regions of the support portions, wherein the wall comprises a varying thickness over the circumference, wherein the thickness in the support portions is smaller than in the spring portions.

15 Claims, 6 Drawing Sheets

(51) Int. Cl.
*F16D 1/10* (2006.01)
*F16D 1/12* (2006.01)

(56) References Cited

U.S. PATENT DOCUMENTS

| | | | | |
|---|---|---|---|---|
| 4,205,424 | A | * | 6/1980 | Nagao ................. B25B 27/0092 |
| | | | | 29/451 |
| 5,048,998 | A | | 9/1991 | Viets |
| 5,429,574 | A | * | 7/1995 | Murakami ............ B65H 27/00 |
| | | | | 193/37 |
| 6,422,948 | B1 | * | 7/2002 | Murakami ................ F16C 3/02 |
| | | | | 464/183 |
| 8,602,675 | B2 | * | 12/2013 | Wright ...................... F16D 1/04 |
| | | | | 403/291 |
| 11,056,940 | B2 | * | 7/2021 | Weinmeister .......... H02K 7/003 |
| 11,303,174 | B2 | * | 4/2022 | Fröhlich .............. H02K 17/165 |

FOREIGN PATENT DOCUMENTS

| | | |
|---|---|---|
| DE | 102 24 477 A1 | 12/2003 |
| DE | 10 2008 043 488 A1 | 6/2009 |
| DE | 102010047445 A1 | 4/2011 |
| DE | 10 2010 039 008 A1 | 2/2012 |
| DE | 10 2015 012 912 A1 | 4/2017 |
| DE | 10 2016 202 416 A1 | 8/2017 |
| DE | 10 2016 215 760 A1 | 3/2018 |
| DE | 10 2016 215 979 A1 | 3/2018 |
| JP | 2004090057 A * | 3/2004 |
| WO | 99 65643 A1 | 12/1999 |

\* cited by examiner

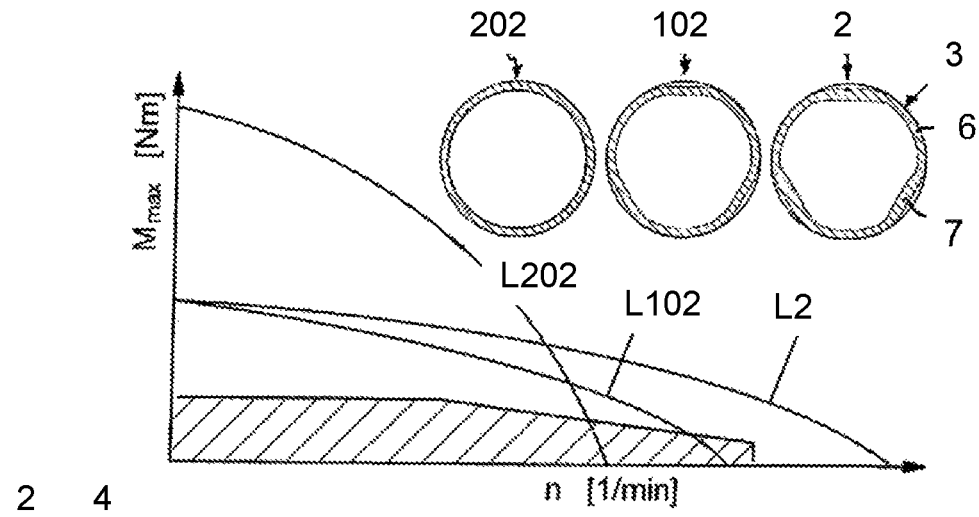
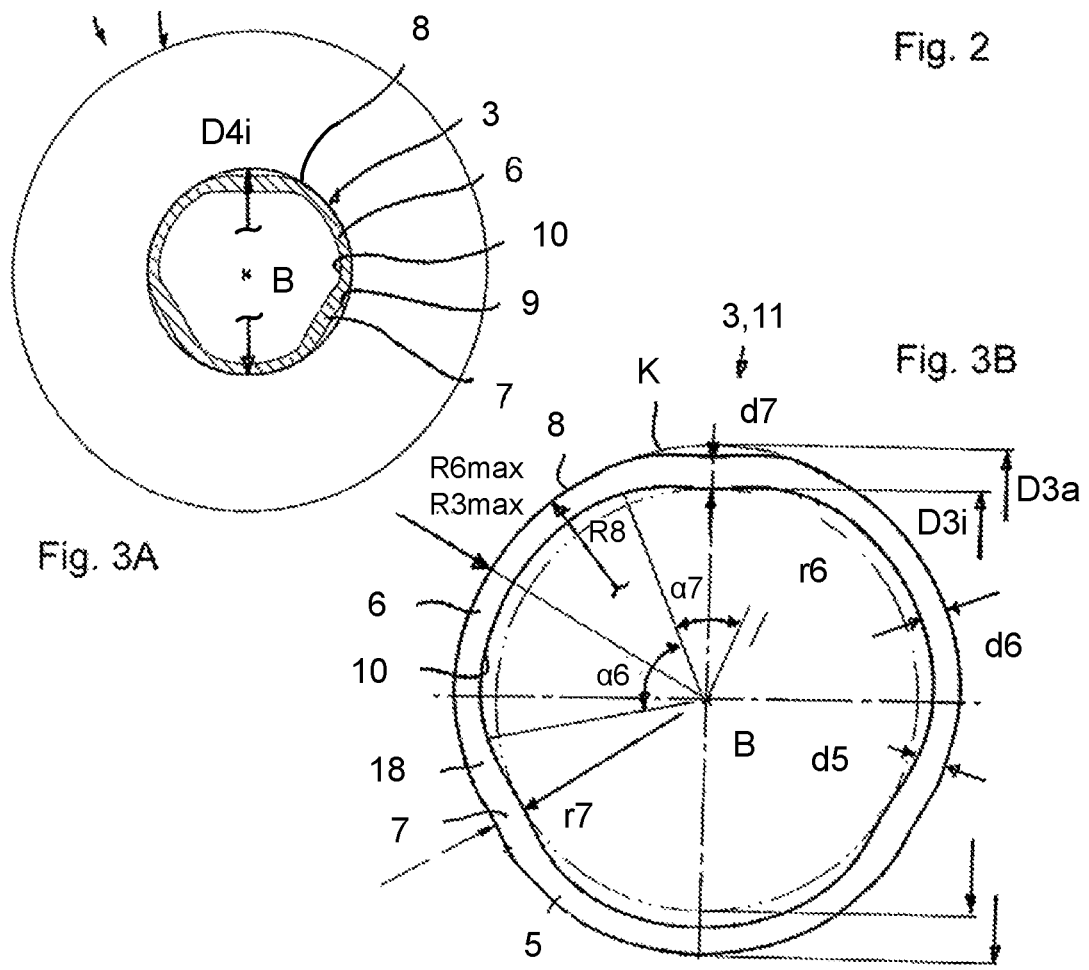
Fig. 2
Fig. 3A
Fig. 3B

SHAFT ASSEMBLY

CROSS-REFERENCE TO RELATED APPLICATIONS

This application is a national stage of, and claims priority to, Patent Cooperation Treaty Application No. PCT/EP2019/074501, filed on Sep. 13, 2019, which application claims priority to German Application No. DE 10 2018 122 977.1, filed on Sep. 19, 2018, which applications are hereby incorporated herein by reference in their entireties.

BACKGROUND

A method of producing a frictionally engaged connection of a shaft and a hub is known from DE 196 24 048. In order to avoid surface damage during assembly, one of the components is plastically deformed oval or polygonal by applying a force, then the oval or polygonal component is largely elastically rounded by applying a further force, the components are assembled while maintaining the further force, and then the further force is cancelled so that the round component springs back into an oval or polygonal shape so that the components are joined together by means of an interference fit.

A shaft-hub connection is known from DE 10 2010 047 445 A1. In the region where the shaft is inserted into the hub, the shaft has a corrugated profile as an outer contour. The opening of the hub has a hollow profile as an inner contour in the region where the shaft is inserted. In an assembly position, the outer contour of the shaft and the inner contour of the hub have a gap distance to each other over their entire circumference. In a functional position, in which the shaft and the hub are rotated relative to each other by an angle, the shaft and the hub are in contact with each other in at least two contact areas.

A detachable shaft-hub connection comprising a plurality of tolerance compensation devices between the shaft and the hub is known from DE 102 24 477 A1. The tolerance compensation device comprises a plurality of webs which are distributed uniformly over the circumference of the shaft or the hub and are firmly connected thereto, each of which has a spring arm bearing under pretension against the hub or the shaft.

A rotor and a manufacturing method therefor are known from DE 10 2010 039 008 A1. The rotor has a rotor shaft and a stack of laminations arranged along a longitudinal section around the rotor shaft. The rotor shaft has a first surface region along the longitudinal portion, the shape of which describes a circular cylinder, and a second surface area formed by structural elements which extend with respect to the rotor axis radially outwardly beyond the first surface region.

DE 195 21 755 C1 describes a connection system for releasably joining two components. For this, one component is temporarily deformed during the joining process so that an effective circumferential contour corresponds to the corresponding circumferential contour of the other component with a predetermined clearance. After positioning both components, a fixed pressure contact of the two effective circumferential contours is produced by at least partial re-deformation.

A method for producing a detachable connection between a hollow body and a shaft is known from WO 99 65643 A1. Herein, a hollow body is elastically deformed by radial compressive forces in such a way that an effective circumferential contour corresponds to the corresponding effective circumferential contour of the shaft with a predetermined clearance, so that the two components can be inserted into each other. After insertion of the two components into each other, a compression connection is produced in that the hollow body is elastically re-formed by reducing the radial compressive forces.

A rotor for an electric machine is known from DE 10 2015 012 912 A1, which has a rotor shaft and several lamination stacks positively attached thereto. The rotor shaft is non-circular in cross-section in the region of the lamination stacks due to form locking elements.

A rotor shaft arrangement for a rotor of an electric motor is known from DE 10 2016 202 416 A1. The arrangement comprises a hollow shaft for receiving a rotor body, and a cooling body arranged in the hollow shaft.

A rotor for an electric machine of a vehicle is known from DE 10 2016 215 760 A1. The rotor has a central shaft and a laminated stack arranged between two retaining disks.

DE 10 2016 215 979 A1 describes a rotor with a rotor shaft and a laminated stack. The rotor shaft has an outer surface with a profiling of a plurality of axially extending material recesses, in which the laminated stack with a corresponding structure engages in a form locking manner.

DE 10 2008 043 488 A1 describes a shaft-hub component with a solid shaft and a hub component. The solid shaft has a hardened surface layer and is formed in partial regions in such a way that it has several radially projecting regions and depressed regions.

It is known to press-fit a hub body onto a shaft so that torque can be transmitted between said parts. In this case, depending on the technical requirements, the respective diameters of the shaft and hub must be manufactured with high accuracy. At high speeds of the connecting arrangement of shaft and hub, a reduction of the interference fit forces may occur.

SUMMARY

Described herein is a connection assembly with a shaft and a hub which ensures a secure connection and thus reliable torque transmission even at high speeds, which furthermore has a long service life and which can be produced easily and cost-effectively.

A shaft assembly comprises: a hollow shaft having an axis of rotation, and a hub body connected to the hollow shaft in a force-locking manner, wherein the hollow shaft comprises, viewed in cross-section, a circumferentially closed wall having a plurality of circumferentially distributed support portions in abutting contact with the hub body, and spring portions spaced from an inner circumferential surface of the hub body, wherein inner surface regions of the spring portions lying on a smaller radius about the axis of rotation than inner surface regions of the support portions. It is particularly provided that the wall has a varying thickness over the circumference, with the thickness in the support portions preferably being less than in the spring portions.

An advantage is that the design of the hollow shaft with circumferentially distributed support portions and spring portions forms an interference fit assembly that can also compensate for larger tolerances or operational deformations. Due to the interference fit assembly, a frictional connection is formed between the hub body and the hollow shaft, which is configured such that the desired torques are transmitted reliably under all operating conditions over the entire service life of the shaft assembly. Due to the circumferentially distributed spring portions, forces act therefrom in the circumferential direction and in the radial direction on the respectively interposed support portions, which are thus pressed resiliently against the contact face of the hub body. The hollow shaft thus acts overall as a radial wave spring which continues to exert radial forces on the hub body even during elastic deformation of the hub body. This advantageously provides geometry compensation for dimensional and positional variations as well as thermal and/or centrifugal force-induced deformations between the shaft and hub. Due to the radial-elastic resilient effect of the shaft tube, a secure frictional contact is always formed between the support portions of the shaft tube and the contact faces of the hub body, so that the production tolerances of the surfaces in contact can be kept relatively rough. In particular, it is possible to dispense with grinding the outer surface of the shaft and/or the inner surface of the hub body. A wall thickness of the shaft that varies over the circumference advantageously leads to a particularly homogeneous distribution of the mechanical stresses and thus to greater radial flexibility and/or resilience. As a result, radial expansion of the hub due to temperature and speed can be compensated up to high speeds. The comparatively low mechanical stresses result in lower stresses on the shaft and/or hub, so that they have a long service life.

In addition to the force-locking connection between the shaft tube and the hub body formed as described herein, form-locking and/or material connections can optionally also be provided, which can preferably be arranged in the region of the support portions.

The hub body can be pressed onto the hollow shaft to produce the force-fit connection between shaft and hub. In particular, the hub body can be connected to the hollow shaft by a longitudinal press-fit assembly or transverse press-fit assembly. To produce a longitudinal press-fit assembly, the hub is pressed onto the shaft seat under high axial force. To produce a transverse press-fit assembly, the hub is heated and/or the shaft is cooled before assembly. This causes the hub to expand or the shaft to shrink, enabling both parts to be joined with reduced force. With the subsequent temperature equalization, pressure is established, with the surface roughness remaining largely unchanged. This results in a tighter fit than with a longitudinal press-fit assembly. Before assembly, the hollow shaft can have a surface roughness of at least 0.1 Rz and/or up to 1000 Rz, in particular from 1.0 Rz to 100 Rz. The same applies to the surface roughness of the hub body, which may be at least 0.1 Rz and/or up to 1000 Rz, in particular from 1.0 Rz to 100 Rz.

The wall of the hollow shaft preferably has a varying thickness over the circumference, although a constant wall thickness over the circumference is also possible in principle. By appropriately forming the wall thickness over the circumference, the stresses effective between the shaft and the hub can be adjusted in accordance with the technical requirements. In this case, the stresses in a shaft assembly whose shaft has a varying wall thickness are significantly lower than in a comparable shaft assembly whose shaft has a constant wall thickness (for the same material with identical strength).

According to an example, the wall of the hollow shaft is configured such that a smallest inner radius of the support portions is larger than a smallest inner radius of the spring portions. In other words, the support portions form absolute maxima of the wall, while the intermediate spring portions form absolute minima. Both the outer surface and the inner surface of the hollow shaft have a particularly polygonal shape when viewed in cross-section. This applies to the unassembled and/or assembled state of the hollow shaft.

Technically, the spring portions correspond to both sides (in each circumferential direction) to a bending beam loaded with a single load. By appropriate configuration of the geometric proportions of the spring portions, such as thickness, curvature and/or circumferential length, the spring behavior and thus the resulting spring characteristic curve of the hollow shaft and thus in turn the radial-elastic interference fit between shaft and hub can be configured as required. The spring characteristic can be designed and/or set to be progressive, i.e., with increasing spring force at increasing spring travel, degressive, i.e., with decreasing spring force at increasing spring travel, or linear, i.e. with constant spring force over the spring travel. The spring portions can have a convex inner surface, a concave inner surface, a straight inner surface and/or combinations thereof.

Configuring the hollow shaft with a thicker wall and/or shorter free bending length of the respective spring portion between two support portions adjacent in the circumferential direction results in higher rigidity with higher radial preload forces. Configuring the hollow shaft with a thinner wall and/or longer free bending length of the respective spring portion between two support portions adjacent in the circumferential direction results in lower rigidity with lower radial preload forces.

The number and the extension of the support portions and the spring portions, respectively, also have an effect on the spring behavior and thus on the interference fit between the shaft and the hub. Preferably, the hollow shaft has three support portions and three spring portions arranged alternately around the circumference. This results in good centering and mutual support of the shaft and hub. However, it is understood that other numbers are possible, such as two, four, five, six or more support portions or spring portions, respectively, with an odd number being preferred for centering reasons. The support portions and spring portions, respectively, are preferably regularly distributed over the circumference, so that, accordingly, a uniform force-locking connection is produced over the circumference.

According to one possible example, the support portions can respectively extend over an angular range of at least 5°, preferably at least 30°, viewed in a cross section. Alternatively or additionally, the support portions can respectively extend over a maximum angular range of up to 115°, preferably up to 90°, viewed in a cross section.

The spring portions can respectively extend over an angular range of at least 5°, preferably at least 30°, viewed in across section. Alternatively or additionally, the spring portions can respectively extend over a maximum angular range of up to 115°, preferably up to 90°, viewed in a cross section.

According to a possible example, the spring portions can be designed such that they are substantially subject to compressive stresses when the hub body is in the assembled condition. For this, by specifically configuring the geometric shape of the shaft with varying wall thickness, the load in the shaft can be set in such a way that tensile stresses resulting from tangential bending and being particularly detrimental to failure, can be compensated for by compressive stresses resulting from normal stress in the tangential direction. In particular, the wall can have a smaller thickness in the support portions than in the spring portions for a particularly favorable stress distribution. In this case, the maximum thickness of the spring portions can be, for example, at least 1.1 times, in particular at least 1.2 times, preferably at least 1.5 times as great as the minimum thickness of the support portions. According to a possible further specification, the wall thickness is formed variably within the support portions in the circumferential direction. In this case, the wall thickness in a central region of the respective support portion can be thinner than in the end regions of the support portion (in each circumferential direction) which merge into the respective adjacent spring portion.

The support portions can have an outer contour adapted to the inner contour of the hub body, which is in particular circular cylindrical. This provides a full-face abutment and thus frictional contact with the hub body over the entire circumferential length of the support portions. It is also possible that the outer contour of the hollow shaft comprises absolute maxima in an unassembled state in a circumferential region of the support portions and that in the joining process the support portions, starting from the absolute maxima, come into surface contact in both circumferential directions with the circular-cylindrical inner contour of the hub body. In the mounted state, the inner circumferential surface of the hollow shaft has a smaller distance to the axis of rotation in the circumferential regions of the spring portions than in the circumferential regions of the support portions.

The support portions, starting respectively from the support portions adjacent thereto in the circumferential direction, can comprise a continuously increasing radial distance to an imaginary circular line with the radius of the outer circumferential face of the support portions and/or the inner circumferential face of the hub body.

According to a preferred example, the hollow shaft is configured such that the radial spring travel (s3) of the hollow shaft is:

$$s3 = (R3\max - R3\min) > \frac{R_{p0,2} * A}{E * \pi * D_{3a}} * \left(1 - \frac{\pi * D_{3a}^2}{2 * A} - \mu\right)$$

wherein R3max is the maximum radius of the shaft in the unmounted state, R3min is the maximum radius of the shaft in the maximum radially elastic compressed state, D3a is twice the maximum radius (R3max) of the shaft in the unmounted state, E is the modulus of elasticity of the shaft, A is the cross-sectional area of the shaft, p is the transverse contraction coefficient of the shaft, and Rp0.2 is the yield strength of the material of the shaft. The spring travel of the hollow shaft can be configured, for example, to more than 1.1 times, in particular more than 1.2 times, the specified formulaic term. The greater the spring travel, the greater the geometric compensation that can be achieved to compensate for dimensional and positional deviations as well as thermal and/or centrifugal force-induced deformations between the shaft and hub.

Alternatively or in addition, the hollow shaft can be configured in such a way that for the spring rate (k3) of the hollow shaft applies:

$$k3 = \frac{F_{rad}}{U_{34}} < \pi * l_{34} * E * \left(1 - \frac{\pi * D_{3a}^2}{2 * A} - \mu\right)^{-1}$$

wherein Frad is the effective radial forces between the shaft and the hub body in the assembled state, U34 is the effective interference between the largest outside diameter (D3a) of the shaft and the smallest inner diameter (D4i) of the hub body in the unmounted state, E is the modulus of elasticity of the shaft, l34 is the length of the joining face between the shaft and the hub body, D3a is twice the maximum radius (R3max) of the shaft in the unmounted state, and μ is the transverse contraction coefficient of the shaft. The spring rate can be for example less than 0.9 times, in particular less than 0.8 times, the specified formulaic term. In this case, a lower spring rate leads to correspondingly lower loads in the contact area between the shaft and hub.

In principle, the shaft assembly can be used for any application in which torque is to be transmitted between a hub body and a shaft body. For example, the hollow shaft can be designed as a motor shaft for an electric motor, in which case the hub body can have a rotor laminations package consisting of several rotor laminations. In this case, the shaft assembly is capable of ensuring a secure frictional connection to the hub even at high speeds of, for example, 1,500 rpm and more due to the radial spring effect of the hollow shaft.

The hollow shaft may have a shaft tube and two journal members connected thereto at the ends. At least one of the journal elements may have a connecting portion for connecting to an end portion of the shaft tube, wherein the circumferential contour of the connecting portion can be adapted to the mating contour of the shaft tube, so that the journal element and the shaft tube engage in a form-locking manner. The connecting portion can be inserted into the shaft tube, wherein in this case the circumferential contour is an outer contour that is adapted to the opposing inner contour of the shaft tube. Alternatively, the connection can also be inversely configured, wherein the inner contour of the connecting portion engages form-fittingly into the outer contour of the shaft tube.

BRIEF SUMMARY OF THE DRAWINGS

Examples are explained below with reference to the drawing figures, which are as follows.

FIG. 2 shows a graphical representation of the transmittable maximum torque over the speed of a shaft assembly with variable wall thickness over the circumference, compared with a shaft assembly according to the state of the art, with constant wall thickness over the circumference;

FIG. 3A shows a cross-section of a shaft assembly in a slightly modified example;

FIG. 3B shows an enlarged view of the hollow shaft of the shaft assembly in FIG. 3A with further details;

DETAILED DESCRIPTION

Figure 1A:
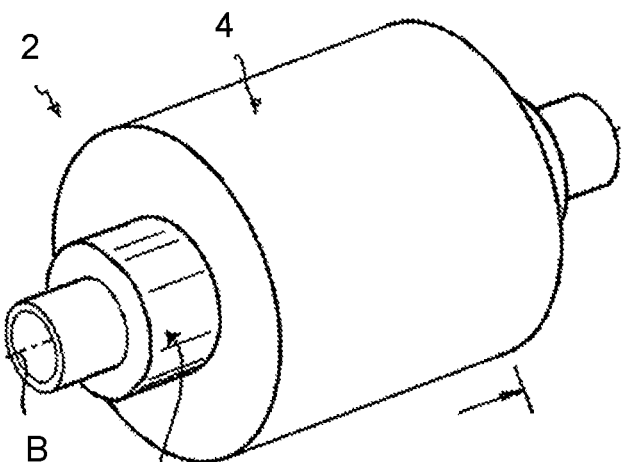
FIG. 1A shows a three-dimensional view of a shaft assembly according to a first example.

FIGS. 1A to 1E, which are described together below, show a shaft assembly 2 in a first example. The shaft assembly 2 comprises a hollow shaft 3 and a hub body 4, which are frictionally connected to each other. The frictional connection of the two components (3, 4) is made in particular by means of an interference fit, wherein a longitudinal interference fit or transverse interference fit can be used.

Viewed in cross section, the hollow shaft 3 has a circumferentially closed wall 5 with a plurality of support portions 6 distributed over the circumference and spring portions 7 alternating therewith in the circumferential direction. In the assembled state of the hub body 4, the spring portions 7 are elastically pre-stressed so that they load the support portions 6 located therebetween in the circumferential direction and in the radial direction. As a result, the support portions 6 are in frictional contact with the hub body 4 under radial pre-tensioning force, so that a torque can be transmitted between the shaft and the hub.

The spring portions 7 and the support portions 6 can be configured in the same manner respectively among each other, and in particular symmetrical. Starting from a central region located centrally between two support portions 6 adjacent in the circumferential direction, the spring portions 7 form in each circumferential direction respectively a bending beam loaded with an individual load. By appropriate configuring the geometrical proportions of the spring portions 7, such as thickness, curvature and/or circumferential length, the spring behavior and thus the press fit between shaft 3 and hub 4 can be set according to the technical requirements in terms of speed and torque.

The wall 5 of the hollow shaft is configured in particular such that the inner circumferential face 10 of the hollow shaft 3, viewed in cross section, has a maximum distance from the axis of rotation B in a circumferential region of the support portions 6, and has a minimum distance from the axis of rotation B in a circumferential region of the spring portions 7. A smallest inner radius r6 of the support portions 6 can be larger than a smallest inner radius r7 of the spring portions 7. That is, the support portions 6 form absolute maxima of the wall 5, while the intermediate spring portions 7 form absolute minima.

Viewed in cross-section, the support portions 6 are in contact with a support face 8 over a certain circumferential extent with the inner face 9 of the hub body 4. It generally applies that the number and the extension of the support portions 6 and the spring portions 7, respectively, influence the springing behavior and thus the pre-tensioning force of the press-fit assembly between the shaft 3 and the hub 4. The support portions 6 have an outer contour 8 adapted to the inner contour 9 of the hub body 4, wherein the inner contour 9 of the hub body 4 is circular cylindrical.

The hollow shaft 3 is configured such that the support portions 6 in the unassembled state of the arrangement have a maximum outer radius R6max which is greater than the inner radius r4 of the hub 4. The maximum outer radius R6max is to be understood as the radius which extends from the axis of rotation B to a point on the surface of the support portions 6 at a maximum radial distance therefrom. The maximum outer radius of the shaft 3 formed by the maximum outer radius R6max of the support portions 6 is designated R3max. The outer contour of the support portions 6 can have an outer radius R8 deviating from the maximum radius R6max, which in the unassembled state of the hub can in particular also be slightly smaller than the inner radius r4 of the hub 4. The spring portions 7 can have, starting from the support portions 6 adjacent thereto in the circumferential direction, respectively a continuously increasing radial distance to an imaginary circular line K with radius R6max through the maximum of the support portions, respectively to the circular cylindrical inner face 9 with inner radius r4 of the hub 4.

Figure 1B:
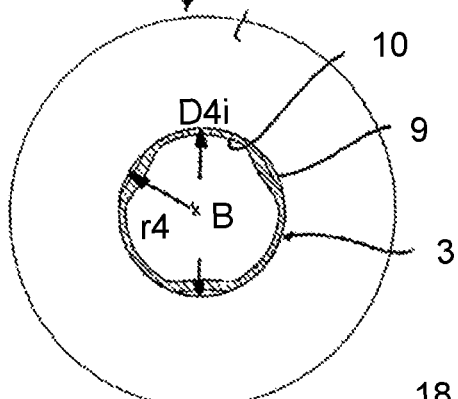
FIG. 1B shows a cross-section of the shaft assembly of FIG. 1A.
Figure 1C:
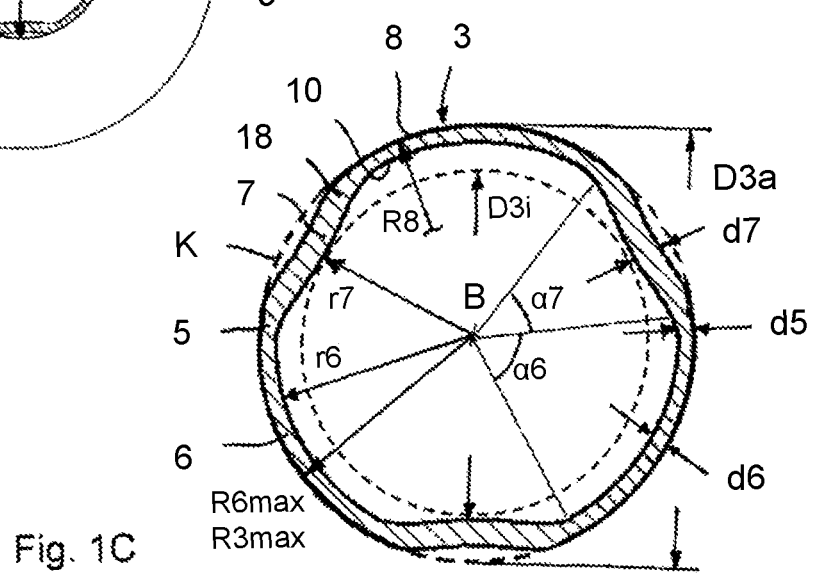
FIG. 1C shows the hollow shaft of the shaft assembly of FIG. 1A as a detail in cross-section.
Figure 1D:
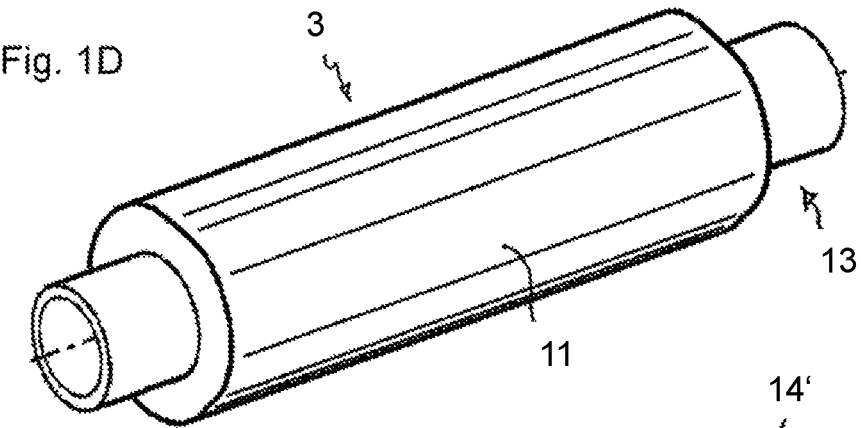
FIG. 1D shows a three-dimensional view of the hollow shaft shown in FIGS. 1A and 1C.

It can be seen, in particular in FIGS. 1B and 1C, that the hollow shaft 3 in the present example has three support portions 6 and three spring portions 7, which are distributed alternately and regularly around the circumference. This results in good centering and mutual support of the shaft and hub. The design with three support portions and three spring portions results in a respective pitch of 120° about the axis of rotation B. Viewed in cross section, the support portions 6 extend respectively over an angular range α6 of, in particular, about 60° to 90° about the axis of rotation, and/or are in contact with the inner face 9 of the hub 4 over said angular range. Accordingly, the spring portions 7, which are contactless with respect to the hub 4 in the assembled state thereof, each extend over an angular range α7 of approximately 30° to 60° in the circumferential direction, viewed in cross-section. However, it is understood that the shaft 3 can also have a different number than three of contact and spring portions 6, 7, with which correspondingly different circumferential lengths are possible.

It can be seen in particular in FIG. 1C that the wall 5 of the hollow shaft 3 has a thickness d5 varying over the circumference. In this case, a mean and/or smallest wall thickness d6 in the support portions 6 is smaller than a mean and/or smallest wall thickness d7 in the spring portions 7. In the present example, the wall thickness d7 of the spring portions 7 is substantially constant in the circumferential direction, although a varying course is also possible. The wall thickness d6 of the support portions 6 is also substantially constant in the circumferential direction. A transition section 18 with a wall thickness that varies in the circumferential direction is respectively formed between the support portions 6 and the spring portions 7, wherein the wall thickness changes in particular continuously in this transition section 18. The largest and/or average wall thickness d7 of the spring portions 7 can be at least 1.5 times the smallest wall thickness d6 of the support portions 6.

Figure 1E:
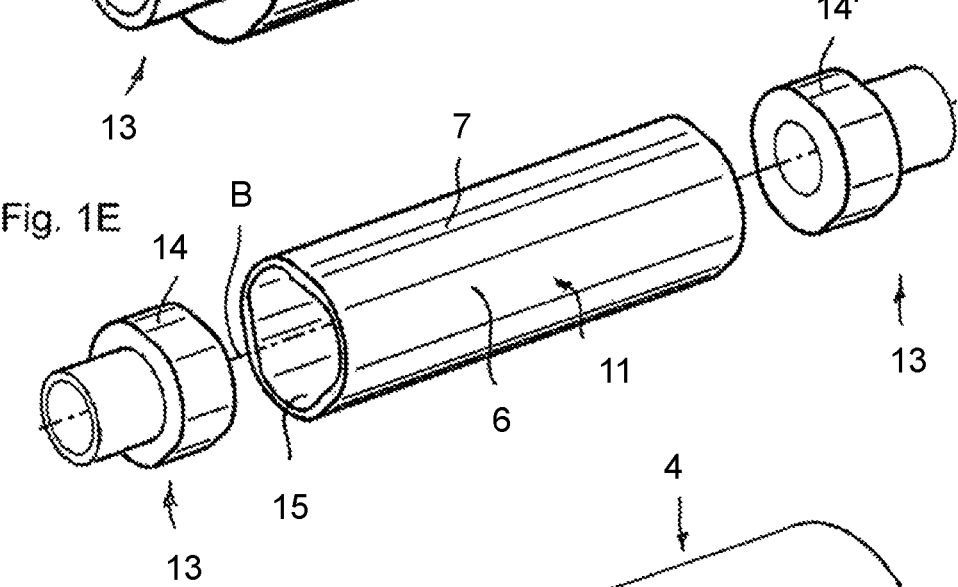
FIG. 1E shows an exploded perspective view of the hollow shaft shown in FIG. 1D.
Figure 1F:
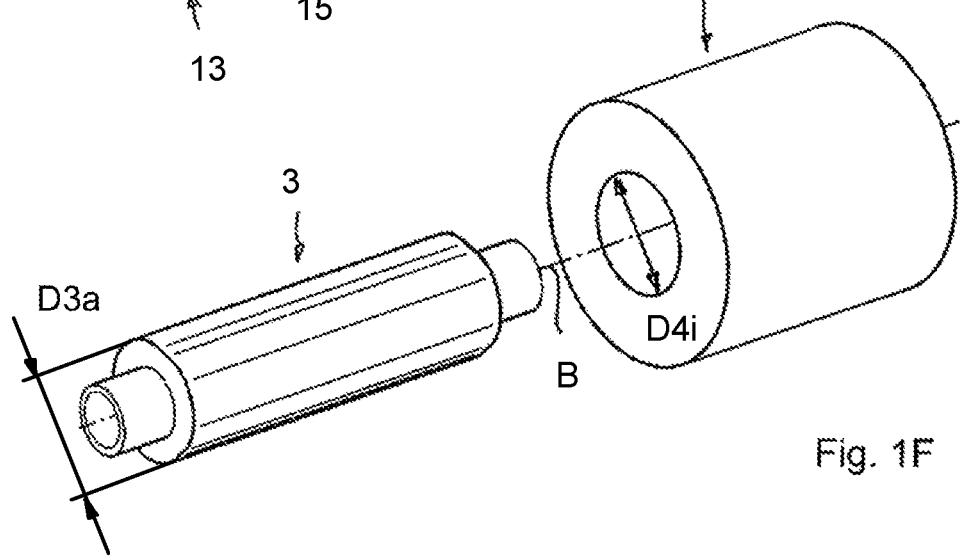
FIG. 1F shows a perspective view of the shaft assembly shown in FIG. 1D during assembly.

As can be seen in particular from FIG. 1E, the hollow shaft 3 comprises a shaft tube 11 and two journal elements 13, 13' connected thereto at the ends 12, 12'. The journal elements 13, 13' each have a connecting portion 14, 14' whose outer contour is adapted to the inner contour 15 of the shaft tube 11. The journal elements 13, 13' are pressed into the ends of the shaft tube 11 and form-locking and force-locking connection therewith, although other types of connection, such as a material connection (welding), are also possible. The shaft tube 11 can be produced with the spring portions 7 provided therein, for example, by drawing, hydroforming or radial hammering or rotary swaging. In the drawing process, a round input tube with constant wall thickness is drawn through a drawing die which forms the cross-sectional contour of the shaft 3 and, where applicable, sets a wall thickness which varies over the circumference. By specifically configuring the drawing and annealing process, the strength of the shaft 3 can be set such that hardening is not necessary afterwards.

The surface roughness of the hollow shaft before assembly can be between 0.1 Rz and 1000 Rz, in particular between 1.0 Rz and 100 Rz. The same applies to the surface roughness of the hub body.

The hollow shaft can be configured such that its radial travel s3 is greater than:

$$\frac{R_{p0,2} * A}{E * \pi * D_{3a}} * \left(1 - \frac{\pi * D_{3a}^2}{2 * A} - \mu\right)$$

and/or that its spring rate k3 is less than:

$$\pi * l_{34} * E * \left(1 - \frac{\pi * D_{3a}^2}{2 * A} - \mu\right)^{-1}$$

It applies that a possible geometry compensation between shaft 3 and hub 4 increases with increasing spring travel s3 and that the loads in the contact area between shaft and hub decrease accordingly with decreasing spring rate k3.

FIG. 2 shows in graphic form the maximum torque over speed (line L2) that can be transmitted by the shaft assembly 2, compared with a shaft assembly 202 with a round hollow shaft with constant wall thickness (line L202), and a shaft assembly 102 with a polygonal hollow shaft with constant wall thickness (line L102), respectively.

It can be seen that for a shaft assembly 202 with a round hollow shaft with constant wall thickness, the maximum transmissible torque Mmax decreases sharply with increasing speed n (curve 202). Compared with this, the curve L102 for the maximum transmissible torque Mmax falls flatter for a shaft assembly 102 with a polygonal hollow shaft with constant wall thickness. This means that high torques can still be transmitted even at higher speeds. The best results are achieved by the shaft assembly 2, whose hollow shaft has a variable wall thickness over the circumference. It can be seen from the associated characteristic curve L2 that this slopes much flatter towards higher speeds n. This results in an advantageous torque transmission. Advantageously, this results in an even higher speed capacity for transmitting the required high torques. This is achieved by the circumferentially distributed spring portions 7 exerting spring forces on the respective intermediate support portions 6, which are thus pressed against the contact face of the hub body 4. The wall thickness of the shaft, which varies over the circumference, supports a homogeneous stress distribution, resulting in a particularly strong radial spring effect. This results in a particularly large geometry compensation for dimensional and positional deviations as well as thermal and centrifugal force-induced deformations between the shaft 3 and hub 4, so that a secure frictional connection between the components (3, 4) is maintained even at high speeds.

FIGS. 3A and 3B, which are jointly described below, show a shaft assembly 2 in a slightly modified example. This largely corresponds to the example according to FIGS. 1 and 2, so that reference is made to the above description with regard to the common features. The same and/or corresponding details are provided with the same reference signs as in FIG. 1.

A difference lies in the shape of the spring portions 7, which have a somewhat smaller circumferential extension α7 and are less inwardly deformed. Accordingly, the support portions 6 have a somewhat larger circumferential extension α6 than in the above example. This results in greater rigidity of the hollow shaft 3, which leads to correspondingly greater forces in the interference fit between the shaft 3 and the hub body 4.

FIGS. 4A to 4D, which are described together below, show a shaft assembly 2 in a further example. This corresponds largely to the examples according to FIGS. 1 to 3, so that reference is made to the above description with regard to the common features. The same and/or corresponding details are provided with the same reference signs as in FIGS. 1 to 3.

In the present example according to FIG. 4, the wall 5 of the hollow shaft 3 has a thickness d5 that varies over the circumference. A mean and/or smallest wall thickness d6 in the support portions 6 is smaller than a mean and/or smallest wall thickness d7 in the spring portions 7. In the present example, the spring portions 7 are straight. The wall thickness of the spring portions 7 is substantially constant in the circumferential direction, although a variable course is also possible. In the end regions adjoining the spring portions 7, the wall thickness of the support portions 6 is variable in the circumferential direction, in particular with continuous transitions. In this case, viewed in cross-section, the wall thickness d6 in a central region of the respective support portion 6 is thinner than in the end regions of the support portion (in each circumferential direction) which merge into the respective adjacent spring portion 7. The largest and/or average wall thickness d7 of the spring portions 7 is at least 1.5 times the smallest wall thickness d6 of the support portions 6. The circumferential extent of the spring portions 7, which are non-contacting with respect to the hub 4 in the assembled state thereof, can be between 30° and 60° in this example. The circumferential extent of the support portions 6, which are in contact with the hub 4 in the assembled state, is correspondingly between 60° and 90°.

Figure 4A:
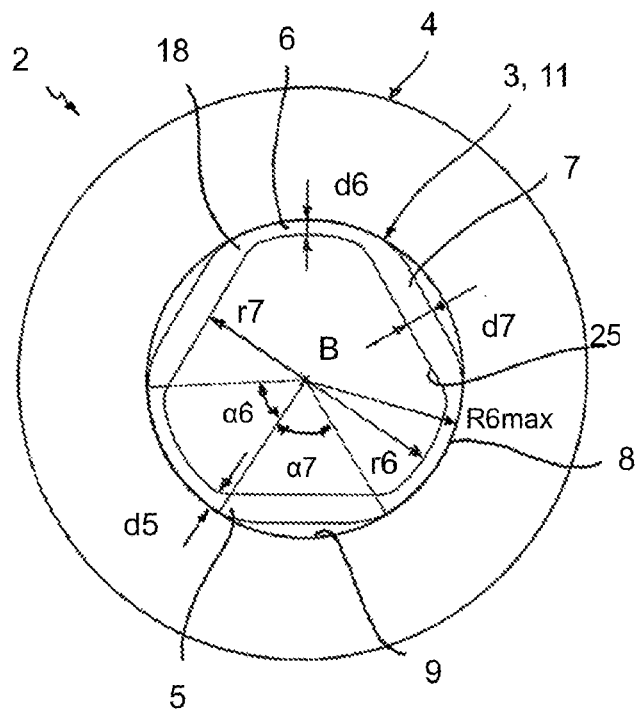
FIG. 4A shows a cross-section of a shaft assembly in a further example.
Figure 4D:
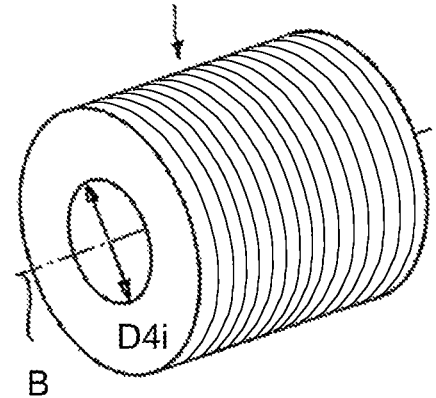
FIG. 4D shows a perspective view of the rotor body of FIG. 4A.
Figure 4B:
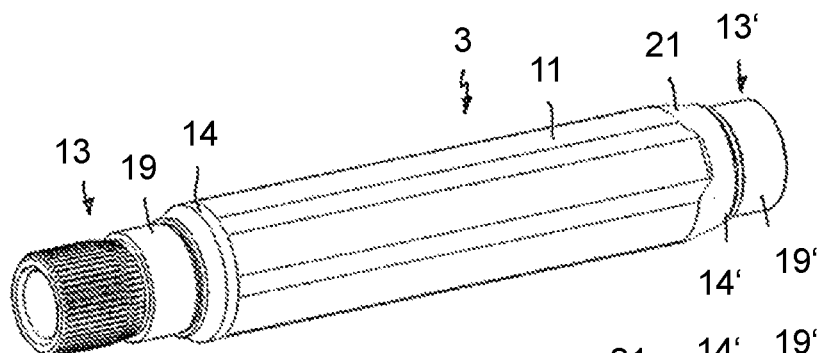
FIG. 4B shows a perspective view of the hollow shaft of the shaft assembly of FIG. 4A.
Figure 4C:
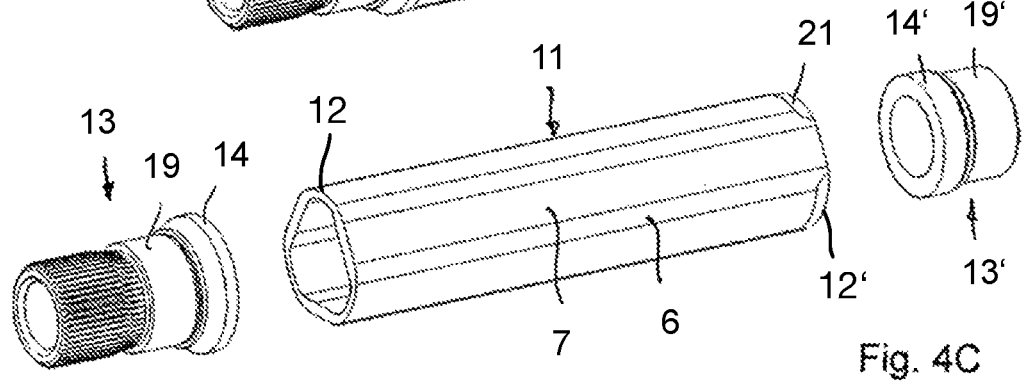
FIG. 4C shows an exploded perspective view of the hollow shaft shown in FIG. 4A.

As shown in particular in FIG. 4C, the hollow shaft 3 comprises a shaft tube 11 and two journal elements 13, 13' connected thereto at the ends 12, 12'. The journal elements 13, 13' each have a connecting portion 14, 14' for connection to the shaft tube 11 and a bearing section 19, 19' for rotatably supporting the shaft in a stationary component. The connecting portions 14, 14' are formed in a flange-like manner and are placed frontally on an associated end face of the shaft tube 11 and firmly connected thereto. The connection can be made, in particular, in a material-locking manner by welding. One of the journal elements 13 has shaft splines for being connected in a rotationally fixed manner to a connecting component (not shown), wherein it is understood that, depending on the application, the other journal element 13' can also be configured accordingly with shaft splines. A further feature of the present example is that the hollow shaft 3 has an end portion with a conical outer face 21. The conical outer face 21 enables simple assembly of the hub body 4, which is pressed axially onto the hollow shaft 3 for connection.

Figure 5:
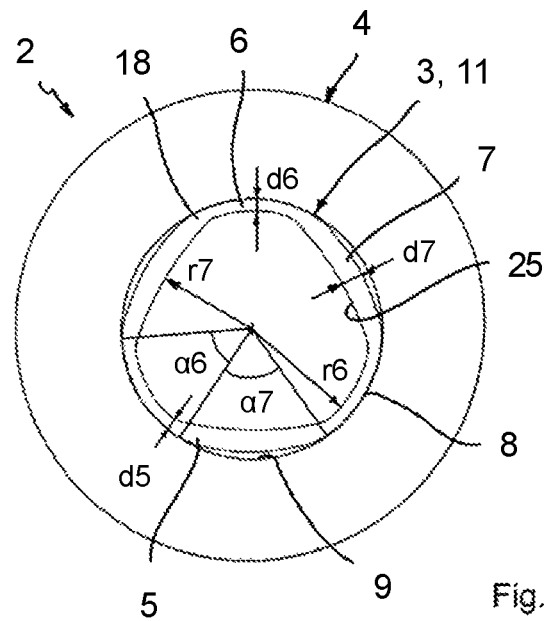
FIG. 5 shows a shaft assembly in a further example in cross-section.

FIG. 5 shows a further example of a shaft assembly 2. This largely corresponds to the example shown in FIG. 4, the description of which it is thus referred. Identical and/or corresponding details are provided with the same reference signs.

In the present example according to FIG. 5, the spring portions 7 are designed with a concave inner face 25, and/or are curved concavely overall between the transition portions 18 adjoining in the circumferential direction. Accordingly, the outer face is convex. Furthermore, in the present example, the spring portions 7 are formed longer in the circumferential direction than the support portions 6, without being limited thereto, and in particular have respectively a circumferential extent α7 of more than 60°. Correspondingly, the circumferential extent α6 of the support portions 8 is smaller and is less than 60° respectively, in an example with three support and spring portions in each case.

Figure 6:
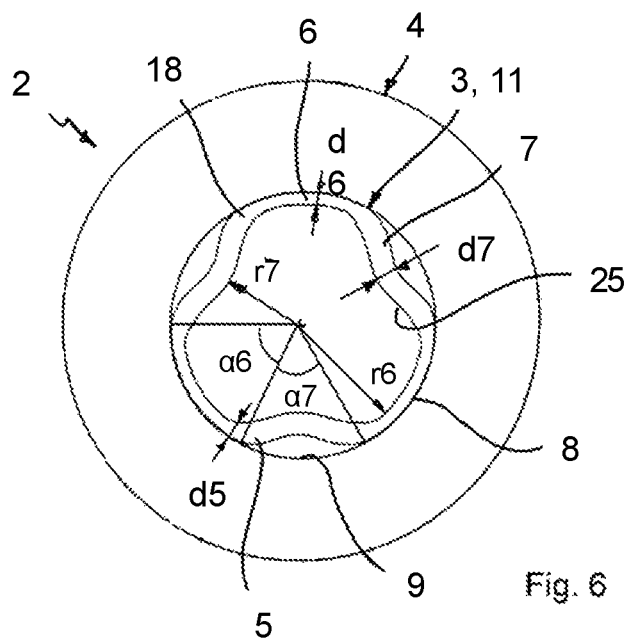
FIG. 6 shows a shaft assembly in a further example in cross-section.

FIG. 6 shows a further example of a shaft assembly 2. This largely corresponds to the example shown in FIG. 4 or FIG. 5, the description of which is thus referred to. The same and/or corresponding details are provided with the same reference signs.

In the present example according to FIG. 6, the spring portions 7 are designed with a convex inner face 25, and/or are curved convexly overall between the transition portions 18 adjoining them on both sides in the circumferential direction. Accordingly, the outer faces of the spring portions 7 are concave. Furthermore, in the present example, the spring portions 7 are formed shorter in the circumferential direction than the support portions 6, without being limited thereto, and in particular have respectively a circumferential extent α7 of less than 60°. Accordingly, the circumferential extent α6 of the support portions 8 is greater than 60°, in an example with three support and spring portions each.

Figure 7:
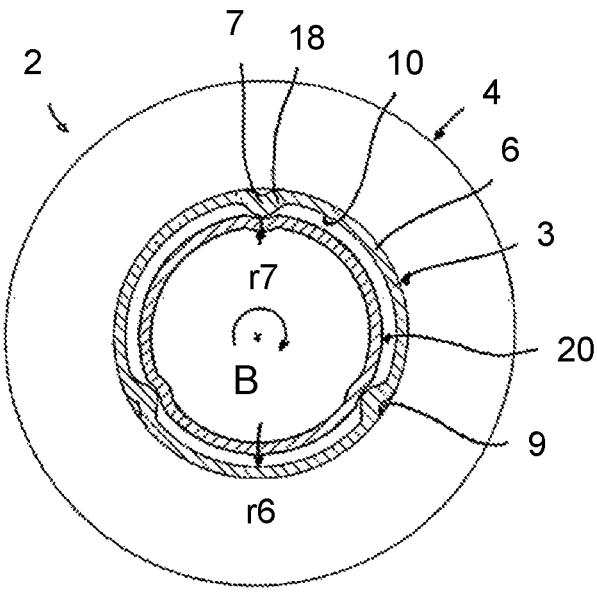
FIG. 7 shows a shaft assembly in a further example in cross-section.

FIG. 7 shows a further example of a shaft assembly 2. This largely corresponds to the example according to FIG. 1, the description of which is thus referred to. The same details are provided with the same reference signs.

In the present example according to FIG. 7, the spring portions 7 are relatively short in the circumferential direction and respectively have a circumferential extent α7 of in particular less than 20°. A tubular component 20 is further provided, which is inserted into the shaft tube 11 and causes elastic or elastic-plastic deformation of the spring portions 7 by relative twisting. The component 20 remains in the shaft tube 11 after the deformation of the spring portions 7 and, as the case may be, can be used for a coolant guiding feature. It is understood that the shaft assemblies 2 according to FIGS. 1 to 4 can also be designed with such a tubular component 20 or one adapted in shape, respectively.

Figure 8:
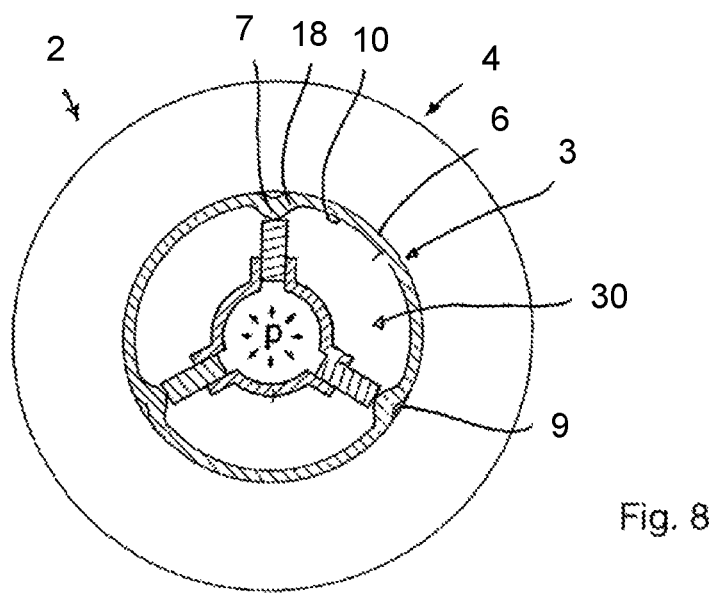
FIG. 8 shows a shaft assembly in a further example in cross-section.

FIG. 8 shows a further example of a shaft assembly 2. This largely corresponds to the example shown in FIG. 7, the description of which it is thus referred to. The same details are provided with the same reference signs.

In the present example according to FIG. 8, the spring portions 7 are radially plastically deformed by means of a suitable expanding tool 30 after the shaft tube 11 and hub body 4 have been assembled. This causes the connecting faces of the components 3, 4 to bear against each other with sufficient contact force. It is understood that such an expanding tool can also be used for the shaft assemblies shown in FIGS. 1 to 6.

As an alternative to the examples according to FIGS. 7 and 8, an example is also conceivable in which the spring portions 7 are radially plastically deformed by internal high-pressure forming after the shaft tube 11 and hub body 4 have been assembled.

LIST OF REFERENCE SIGNS 2 shaft assembly
3 hollow shaft
4 hub body
5 wall
6 support portion
7 spring portion
8 support face
9 inner face
10 inner circumferential face
11 shaft tube
12, 12' end
13, 13' journal element
14, 14' connecting portion
15 inner contour
16, 16' arm
17 reverse portion
18 transition portion
19, 19' bearing portion
20 component
21 outer face
25 inner face of spring portion
30 expanding tool
α circumferential angle
A cross-sectional face
B longitudinal axis
d wall thickness
D diameter
E E-modulus
k spring rate
L characteristic line
M torque
n speed
μ transverse contraction coefficient
r inner radius
R outer radius
s spring travel

The invention claimed is:
1. A shaft assembly, comprising:
a hollow shaft with an axis of rotation; and
a hub body which is connected to the hollow shaft in a force locking manner;
wherein the hollow shaft, viewed in cross-section, includes a circumferentially closed wall with a plurality of circumferentially distributed support portions that are in abutting contact with the hub body, and with spring portions spaced from an inner circumferential face of the hub body;
wherein inner surface regions of the spring portions lie on a smaller radius around the axis of rotation than inner surface regions of the support portions; and
wherein the hollow shaft is configured so as to have a radial spring travel for which the following applies:

$$s3 = (R3\max - R3\min) > \frac{R_{p0,2} * A}{E * \pi * D_{3a}} * \left(1 - \frac{\pi * D_{3a}^2}{2 * A} - \mu\right)$$

wherein:
s3 is the radial spring travel,
R3max is a maximum radius of the shaft in an unmounted condition,
R3min is a maximum radius of the shaft in a maximum radial-elastic deflected state,
$D_{3a}$ is twice a maximum radius of the shaft in the unmounted condition,
E is a modulus of elasticity of the shaft,
A is a cross-sectional area of the shaft,
μ is a transverse contraction coefficient of the shaft, and
$R_{p0,2}$ is a yield strength of the shaft material.
2. The shaft assembly according to claim 1, wherein a smallest inner radius of the support portions is larger than a smallest inner radius of the spring portions.

3. The shaft assembly according to claim 1,
wherein the support portions, viewed in cross section, respectively extend over an angular range of at least 5° and at most 115°.

4. The shaft assembly according to claim 1,
wherein the spring portions, viewed in cross section, respectively extend over an angular range of at least 5° and at most 115°.

5. The shaft assembly according to claim 1,
wherein the wall has a varying thickness in the circumferential direction within each of the support portions.

6. The shaft assembly according to claim 1,
wherein a maximum thickness of the spring portions is at least 1.1 times as large as a minimum thickness of the support portions.

7. The shaft assembly according to claim 1,
wherein the hollow shaft includes at least three support portions and at least three spring portions arranged alternately along the circumference.

8. The shaft assembly according to claim 1,
wherein the support portions comprise an outer contour adapted to the inner contour of the hub body.

9. The shaft assembly according to claim 1,
wherein, starting from the support portions respectively adjoining in the circumferential direction, the spring portions have a continuously increasing radial distance from an imaginary circular line with a radius of an outer circumferential face of the support portions.

10. The shaft assembly according to claim 1,
wherein the spring portions are configured such that they are substantially subject to compressive stresses in an assembled state of the hub body.

11. The shaft assembly according to claim 1,
wherein the hollow shaft is configured as a motor shaft for an electric motor and has a shaft tube and two journal elements connected to opposite ends of the shaft tube, and
wherein the hub body has a rotor laminate stack comprising a plurality of rotor laminates.

12. The shaft assembly according to claim 11,
wherein at least one of the journal elements comprises a connecting portion connected to an end portion of the shaft tube, with a circumferential contour of the connecting portion being adapted to a mating contour of the shaft tube, so that the journal element and the shaft tube engage into each other in a form-locking manner.

13. The shaft assembly according to claim 1,
wherein at least one of the hollow shaft and the hub body has a surface roughness of at least 0.1 Rz.

14. The shaft assembly according to claim 1,
wherein the wall has a varying thickness along the circumference, with a thickness in the support portions being less than in the spring portions.

15. A shaft assembly, comprising:
a hollow shaft with an axis of rotation; and
a hub body which is connected to the hollow shaft in a force locking manner;
wherein the hollow shaft, viewed in cross-section, includes a circumferentially closed wall with a plurality of circumferentially distributed support portions that are in abutting contact with the hub body, and with spring portions spaced from an inner circumferential face of the hub body;
wherein inner surface regions of the spring portions lie on a smaller radius around the axis of rotation than inner surface regions of the support portions; and
wherein the hollow shaft is configured so as to have a spring rate for which the following applies:

$$k3 = \frac{F_{rad}}{U_{34}} < \pi * l_{34} * E * \left(1 - \frac{\pi * D_{3a}^2}{2 * A} - \mu\right)^{-1}$$

wherein:
k3 is the spring rate,
$F_{rad}$ are effective radial forces between the shaft and the hub body in an assembled condition,
$U_{34}$ is an effective interference between a largest outside diameter of the shaft and a smallest inner diameter of the hub body in an unmounted condition,
E is a modulus of elasticity of the shaft,
$l_{34}$ is a length of a mating surface between the shaft and the hub body,
D3*a* is twice a maximum radius of the shaft in the unmounted condition,
A is a cross-sectional area of the shaft, and
μ is a transverse contraction coefficient of the shaft.

* * * * *